(12) United States Patent
Driessen

(10) Patent No.: US 10,525,999 B2
(45) Date of Patent: Jan. 7, 2020

(54) DEVICE FOR TRANSPORTING A CHILD

(71) Applicant: Mutsy B.V., Goirle (NL)

(72) Inventor: Franciscus Johannes Cornelius Driessen, Goirle (NL)

(73) Assignee: Mutsy B.V., Goirle (NL)

( * ) Notice: Subject to any disclaimer, the term of this patent is extended or adjusted under 35 U.S.C. 154(b) by 0 days.

(21) Appl. No.: 16/085,431

(22) PCT Filed: Mar. 17, 2017

(86) PCT No.: PCT/NL2017/050167
§ 371 (c)(1),
(2) Date: Sep. 14, 2018

(87) PCT Pub. No.: WO2017/160150
PCT Pub. Date: Sep. 21, 2017

(65) Prior Publication Data
US 2019/0111959 A1    Apr. 18, 2019

(30) Foreign Application Priority Data

Mar. 17, 2016 (NL) ..................... 2016449

(51) Int. Cl.
*B62B 7/10* (2006.01)
*B62B 7/06* (2006.01)
(52) U.S. Cl.
CPC ............... *B62B 7/10* (2013.01); *B62B 7/064* (2013.01); *B62B 2205/22* (2013.01)

(58) Field of Classification Search
CPC ....... B62B 7/10; B62B 7/064; B62B 2205/22; B62B 7/068; B62B 7/08
See application file for complete search history.

(56) References Cited

U.S. PATENT DOCUMENTS

| | | | | |
|---|---|---|---|---|
| 5,921,574 | A * | 7/1999 | Driessen | B62B 7/10 280/47.371 |
| 6,722,690 | B2 * | 4/2004 | Lan | B62B 7/08 280/47.38 |
| 7,017,922 | B2 * | 3/2006 | Hartenstine | B62B 7/10 224/409 |
| 7,073,815 | B2 * | 7/2006 | Espenshade | B62B 7/10 280/639 |
| 7,185,909 | B2 * | 3/2007 | Espenshade | B62B 7/10 280/639 |

(Continued)

FOREIGN PATENT DOCUMENTS

| EP | 1493646 A2 * | 1/2005 | ............... B62B 7/10 |
|---|---|---|---|
| EP | 1847439 A1 * | 10/2007 | ............... B62B 7/10 |

(Continued)

OTHER PUBLICATIONS

Jul. 13, 2017—International Search Report and Written Opinion of PCT/NL2017/050167.

*Primary Examiner* — Jacob B Meyer
(74) *Attorney, Agent, or Firm* — Banner & Witcoff, Ltd.

(57) ABSTRACT

A device for transporting a child, particularly one that is provided with a collapsible seat. The seat is coupled to the obliquely upward extending first arms by connecting arms which can slide away from the undercarriage in the first arms. This sliding movement takes place automatically after sufficient downward rotation of the second arms.

17 Claims, 8 Drawing Sheets

(56) References Cited

U.S. PATENT DOCUMENTS

| | | | | |
|---|---|---|---|---|
| 7,188,858 | B2* | 3/2007 | Hartenstine | B62B 7/083 280/642 |
| 7,229,091 | B2* | 6/2007 | Lan | B62B 7/10 280/47.38 |
| 7,404,569 | B2* | 7/2008 | Hartenstine | B62B 7/083 280/47.38 |
| 7,410,186 | B2* | 8/2008 | Hartenstine | B62B 7/083 16/221 |
| 7,410,187 | B2* | 8/2008 | Hartenstine | B62B 7/083 16/221 |
| 7,441,794 | B2* | 10/2008 | Lan | B62B 7/10 280/47.38 |
| 7,614,641 | B2* | 11/2009 | Hartenstine | B62B 7/083 280/47.38 |
| 7,900,952 | B2* | 3/2011 | Cone, II | B62B 7/068 280/642 |
| 8,419,025 | B2* | 4/2013 | Chen | B62B 7/10 280/47.36 |
| 8,419,121 | B2* | 4/2013 | Hu | A47D 1/002 297/16.1 |
| 8,496,263 | B2* | 7/2013 | Wu | B62B 7/068 280/47.38 |
| 8,696,016 | B2* | 4/2014 | Homan | B62B 7/105 280/47.34 |
| 8,827,283 | B2* | 9/2014 | Homan | B62B 7/105 248/503.1 |
| 9,050,993 | B2* | 6/2015 | Pollack | B62B 9/12 |
| 9,174,661 | B2* | 11/2015 | Li | B62B 7/08 |
| 9,327,750 | B2* | 5/2016 | Yi | B62B 3/022 |
| 9,403,549 | B2* | 8/2016 | Driessen | B62B 7/10 |
| 9,475,516 | B1* | 10/2016 | Wang | B62B 7/10 |
| 9,540,027 | B1 | 1/2017 | Hanson | B62B 7/004 |
| 9,776,652 | B2* | 10/2017 | Zhong | B62B 7/008 |
| 10,239,550 | B2* | 3/2019 | Ruggiero | B62B 7/105 |
| 10,286,940 | B2* | 5/2019 | Chen | B62B 7/08 |
| 10,322,740 | B2* | 6/2019 | Chen | B62B 7/10 |
| 2003/0057680 | A1* | 3/2003 | Lan | B62B 7/08 280/642 |
| 2006/0273553 | A1 | 12/2006 | Lan | |
| 2007/0257472 | A1* | 11/2007 | Hartenstine | B62B 7/083 280/642 |
| 2007/0262566 | A1* | 11/2007 | Hartenstine | B62B 7/083 280/642 |
| 2008/0106070 | A1* | 5/2008 | Lan | B62B 7/10 280/647 |
| 2008/0277905 | A1* | 11/2008 | Hartenstine | B62B 7/083 280/642 |
| 2010/0001492 | A1* | 1/2010 | Driessen | B62B 7/145 280/642 |
| 2010/0102535 | A1* | 4/2010 | Zhong | B62B 7/123 280/650 |
| 2010/0127480 | A1* | 5/2010 | Ahnert | B62B 7/08 280/647 |
| 2011/0241313 | A1* | 10/2011 | Homan | B62B 7/105 280/647 |
| 2013/0207369 | A1* | 8/2013 | Pollack | B62B 9/12 280/650 |
| 2013/0221636 | A1* | 8/2013 | Driessen | B62B 7/08 280/650 |
| 2014/0042730 | A1* | 2/2014 | Yi | B62B 3/022 280/650 |
| 2014/0145417 | A1* | 5/2014 | Li | B62B 7/08 280/650 |
| 2015/0353115 | A1* | 12/2015 | Zheng | B62B 7/06 280/47.371 |
| 2017/0057533 | A1* | 3/2017 | Ransil | B62B 7/08 |
| 2018/0065654 | A1* | 3/2018 | Chen | B62B 7/08 |
| 2019/0111959 | A1* | 4/2019 | Driessen | B62B 7/10 |

FOREIGN PATENT DOCUMENTS

| | | |
|---|---|---|
| FR | 2708550 A1 | 2/1995 |
| WO | 2012/036542 A1 | 3/2012 |

* cited by examiner

DEVICE FOR TRANSPORTING A CHILD

This application is a U.S. National Phase Entry of International Application No. PCT/NL2017/050167 filed on Mar. 17, 2017, designating the United States of America. The present application claims priority to and the benefit of the above-identified application, and the above-identified application is incorporated by reference herein in its entirety.

FIELD

The present invention relates to a device for transporting a child. The invention relates more particularly to such a device which is provided with a collapsible seat.

BACKGROUND

A known device comprises a wheel-bearing undercarriage comprising a pair of first arms extending in parallel and at a mutual distance obliquely toward a rear side of the device, wherein ends of the first arms remote from the wheels are provided with respective first hinge parts. The known device further comprises a pair of second arms extending in parallel and at a mutual distance, which are each provided at an end with a second hinge part, wherein the first and second hinge parts engage each other so as to enable a forward rotation of the second arms toward the first arms. The known device further comprises a child seat comprising a back part and a seat part, wherein the back part and the seat part are pivotally connected to each other.

In a position of use the first and second arms usually lie in line, and the second arms are used as pusher. The second arms can here be telescopically adjustable in length and the second arms can be mutually coupled on an upper side, for instance by means of a transverse connection.

The above stated device is at least partially collapsible. The second arms are here rotated forward toward the first arms. The device can optionally be collapsed further by rotating the first arms, and thus also the second arms, toward the remaining part of the undercarriage.

An important aspect for each device for transporting a child, such as a pushchair or buggy, is that the device also provides space for storing items, such as a child's things, clothing or shopping, which is as accessible as possible, i.e. from the rear and sides, with ample clearance. This can for instance be achieved by limiting the use of strengthening beams or arms on the rear side of the device, i.e. behind and under the back part, to a minimum.

A drawback of the minimal use of strengthening beams or arms is that the stability of the child seat and the device as a whole must nevertheless be guaranteed. A further drawback is that the known options for fixing a child seat in folded-out position cannot be applied, or hardly so, in combination with the automatic collapsing when the second arms are rotated forward.

It is an object of the present invention to provide a solution wherein the child seat can be held in place sufficiently firmly when the device has been brought into folded-out state and automatically collapses when the second arms are rotated forward, wherein the space for storing items is accessible from the rear side and from the sides, with ample clearance.

SUMMARY

According to aspects of the invention, the back part of the child seat is connected on either side to the second arms, in that the seat part is pivotally connected to the first arms and in that the child seat is further provided on either side with connecting arms which are each at an end pivotally connected to the seat part and at another end slidably and pivotally connected to a respective first arm.

According to another aspect of the invention, the device further comprises blocking means for blocking or bounding a sliding movement away from the undercarriage of at least one connecting arm relative to the corresponding first arm, wherein the blocking means are configured to terminate the blocking of the sliding movement away from the undercarriage after a forward rotation of the second arms, preferably through an angle greater than a predetermined threshold value.

The blocking means can leave a small clearance in order to prevent excessive forces being exerted on at least one connecting arm. In such a case the blocking means bound the relevant sliding movement to a predetermined displacement.

The blocking means are preferably further configured to allow a sliding movement toward the undercarriage of the at least one connecting arm relative to the corresponding first arm. The seat can in this way be folded out to the locked position of use, also after the first arm has been locked relative to the second arm.

When there is sufficient forward rotation, the connecting arm can slide in the first arm. The triangle which is formed between the point where the seat part is pivotally connected, the point where the connecting arm is coupled to the first arm and the point where the connecting arm is coupled to the seat part can hereby adjust itself to the rotation of the second arms. In combination with the hinged coupling between seat part and back part it becomes possible to rotate the second arms forward and collapse the child seat with one movement.

In an embodiment the predetermined threshold value is almost equal to zero. In such an embodiment performing the rotation, irrespective of the angle, is already sufficient to terminate the blocking effect of the blocking means. This is for instance possible in that the device comprises locking means which simultaneously lock the rotation of the second arms and maintain the blocking of the sliding movement away from the undercarriage.

The device, such as a buggy or pushchair, can be movable between a folded-out state, in which state the blocking means block the sliding movement of the connecting arm away from the undercarriage, and an at least partially collapsed state, in which state the blocking means release or allow the sliding movement away from the undercarriage. The folded-out state corresponds here to the state of use, in which state the device is generally used to transport a child.

The child seat can comprise a plurality of panels attached pivotally to each other. The use of a plurality of panels results in more freedom of movement for the collapsing of the child seat. Both the back part and the seat part can here comprise a plurality of panels, and it is even possible for the back part and the seat part to share a panel or part thereof.

The seat part can be pivotally connected to the first arms at first points, which first points are each arranged between an end of the respective first arm facing toward the wheels and the connection of the corresponding connecting arm to this first arm. A triangular construction is in this way achieved with which the seat part can be held in place sufficiently firmly when the device has been brought into folded-out state.

It is also possible for each first arm to have a guide extending in a longitudinal direction of the first arm, wherein the device further comprises per first arm a slide element received slidably in the guide, wherein each connecting arm is pivotally connected to a respective slide element. The guide can here comprise a groove, wherein the slide element is received at least partially in this groove.

In order to block the movement of the slide element away from the undercarriage the blocking means can comprise a blocking element and a first spring, wherein the blocking element is received slidably in the respective first arm and wherein the first spring is configured to exert a spring tension on the blocking element for the purpose of sliding the blocking block in a direction perpendicularly of the guide, whereby it can block the sliding movement of the slide element away from the undercarriage. It will be apparent to the skilled person that the blocking effect of the blocking element can be terminated by pushing the blocking element counter to the spring tension of the first spring, so that it no longer blocks the path of the slide element.

In order not to block or in order to release the movement of the slide element toward the undercarriage the blocking element can be provided on the upper side with an oblique surface relative to the direction of the guide. This oblique surface is configured such that during a movement toward the undercarriage the slide element engages the blocking element at the oblique surface and displaces it counter to the tension of the first spring, whereby the relevant sliding movement is not blocked.

In order to push in or not to push in the blocking element, the device can comprise a second spring and a release element, wherein the release element extends in the longitudinal direction of the first arm and is received slidably in the first arm. The second spring is configured here to exert a spring tension on the release element for the purpose of making the release element slide in the longitudinal direction. The device is hereby operative in a locked state, in which the release element is held in a first position counter to the spring tension of the second spring, for instance by the second hinge part, in which position the first spring holds the blocking element in a blocking state in which it blocks the sliding movement of the slide element away from the undercarriage. The device is further operative in an unlocked state, in which the release element has moved from the first position and in the longitudinal direction of the first arm, such that the release element engages the blocking element and holds the blocking element in a releasing state in which it releases the sliding movement of the slide element away from the undercarriage.

In order to realize the above stated operation the release element and the blocking element can each be provided with edges which run obliquely as seen in the longitudinal direction of the first arm and which edges engage each other.

The second hinge part can comprise a stop which engages the release element in the locked state and wherein after rotation of the second arm through an angle greater than said threshold value the stop has been displaced such that the release element can move in the longitudinal direction of the first arm, whereby the release element holds the blocking element in the releasing state.

The first arm can be pivotally connected to a remaining part of the undercarriage. It can thus be possible for the first arms to be rotated toward the remaining part so that a particularly compact whole is obtained, whereby the collapsed device can be easily transported or stored.

The remaining part can comprise a plurality of further arms which are disposed substantially in the same plane and wherein wheels are connected to these further arms. It is possible here for some wheels, for instance the front wheels, to take a swivelling form.

The device can comprise a further connecting arm which is slidably and pivotally coupled to one of the first arm and the remaining part of the undercarriage and which is pivotally coupled to the other of the first arm and the remaining part of the undercarriage, wherein the device further comprises a locking for locking the sliding movement of the further connecting arm and an operating member for operating the locking.

In the locked state the operating member can be engaged by the release element such that the operating member cannot be operated. In the unlocked state the operating member can further be released by the release element, whereby it can be operated.

It is preferred for the blocking means to be provided in each of the pair of first arms. The device hereby becomes substantially symmetrical relative to a vertical plane running through the centre line of the device. It is otherwise not necessary that an operating member for operating the locking means, which are configured to lock the further connecting arm, is provided at each first arm.

BRIEF DESCRIPTION OF THE DRAWINGS

The invention will be elucidated in more detail hereinbelow, wherein.

DETAILED DESCRIPTION

Figure 1A:
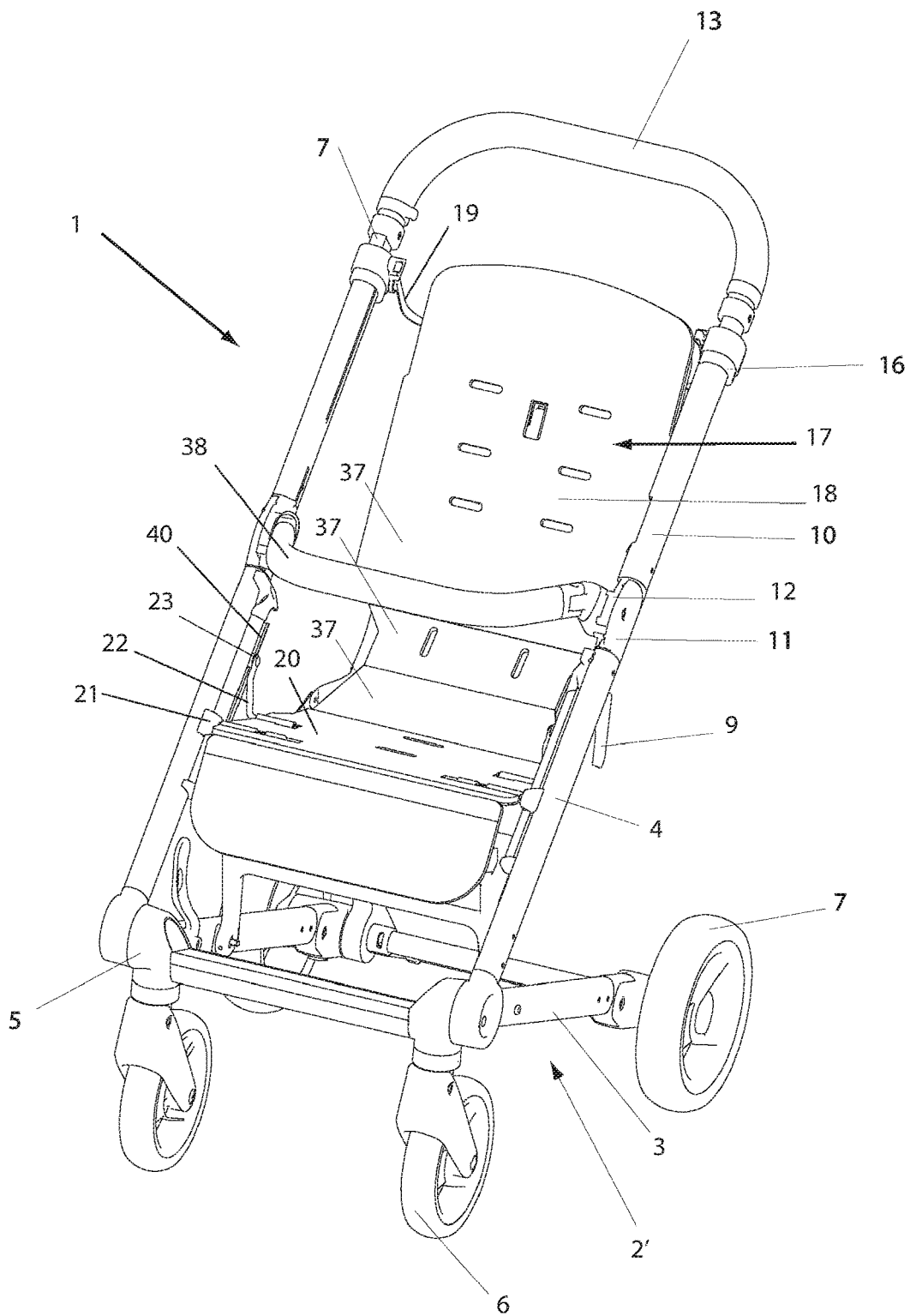
FIGS. 1A-C show different views of an embodiment of a pushchair according to the invention.
Figure 1B:
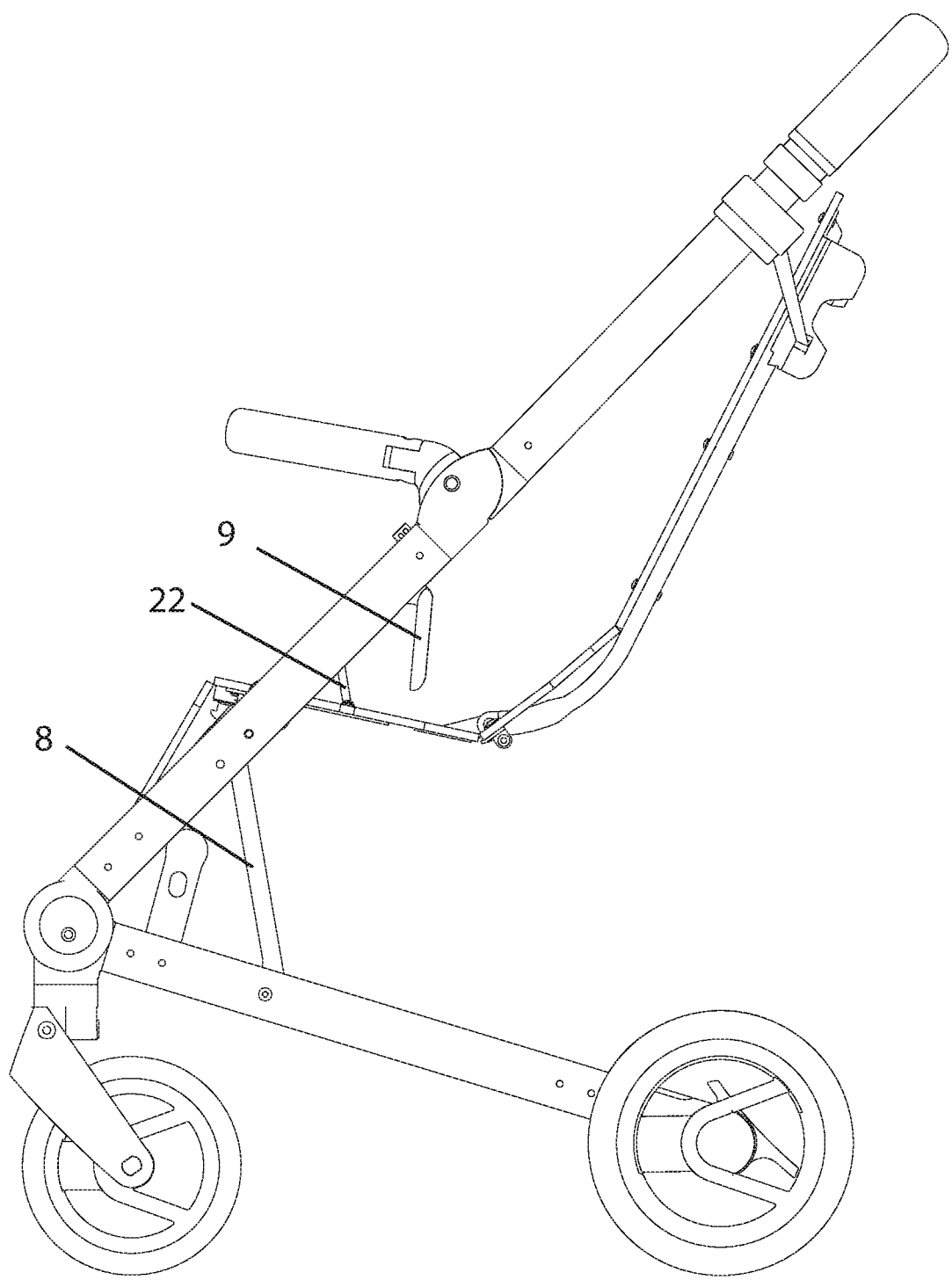
Figure 1C:
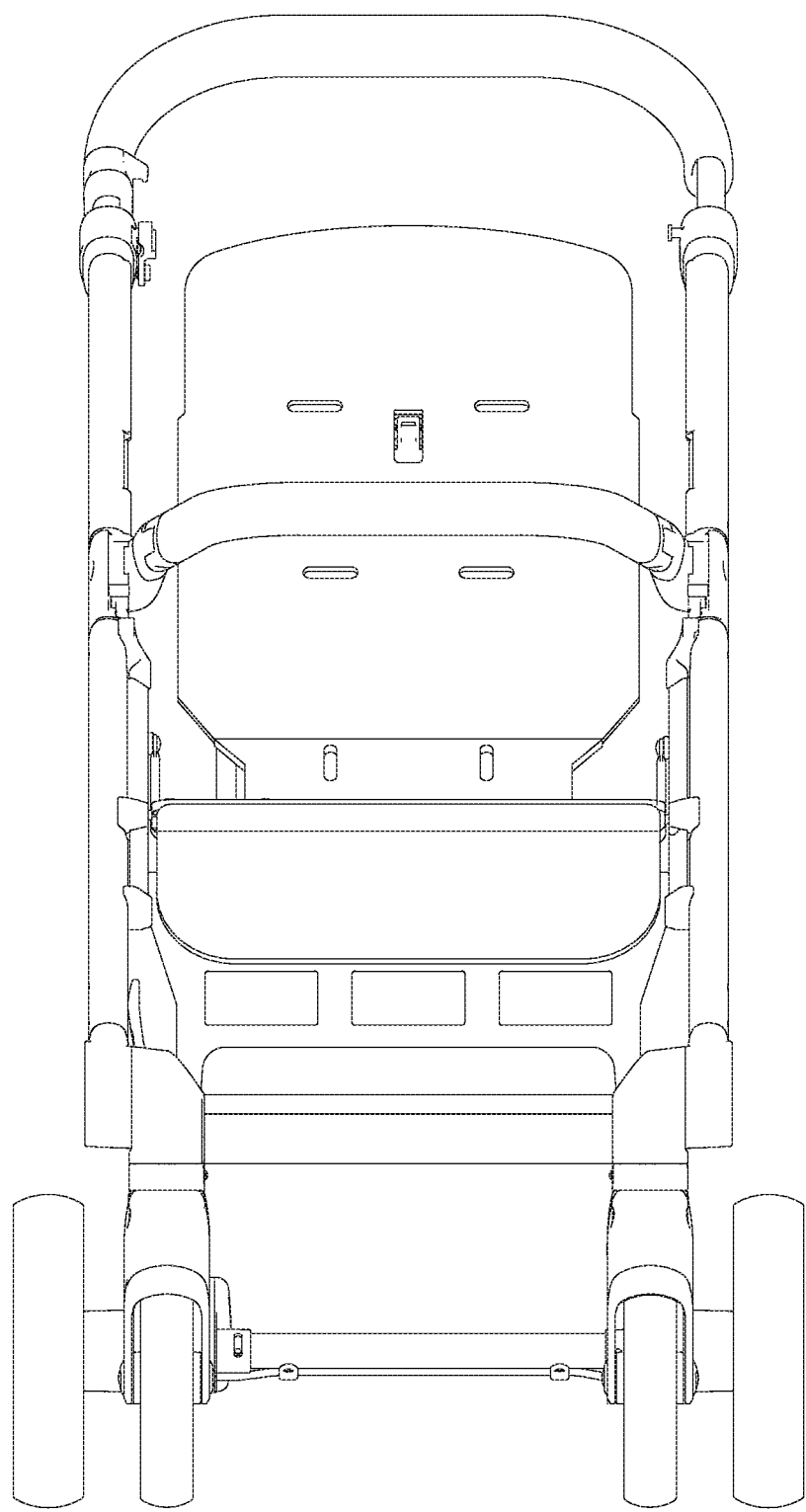

FIGS. 1A-1C show an embodiment of a pushchair 1 according to the present invention. Pushchair 1 comprises a wheel-bearing undercarriage 2'. Undercarriage 2' comprises here a pair of side arms 3 which are pivotally connected at their end to respective first arms 4 by means of a coupling housing 5. Pushchair 1 comprises two front swivel wheels 6 and two rear wheels 7.

FIG. 1B further shows a further connecting arm 8 with which first arms 4 can be fixed relative to side arms 3. The unlocking of this fixation is operated by a handle 9, as will be described below.

Pushchair 1 further comprises second arms 10 which are pivotally connected to first arms 4. Each first arm 4 is for this purpose provided at an end with a first hinge part 11 which engages on a second hinge part 12 at the end of a second arm 10. Second arms 10 further comprise a telescopically adjustable push bar 13.

Pushchair 1 is provided with a detachable bumper bar 38. If desired, this can be taken off prior to collapsing of pushchair 1.

Figure 4:
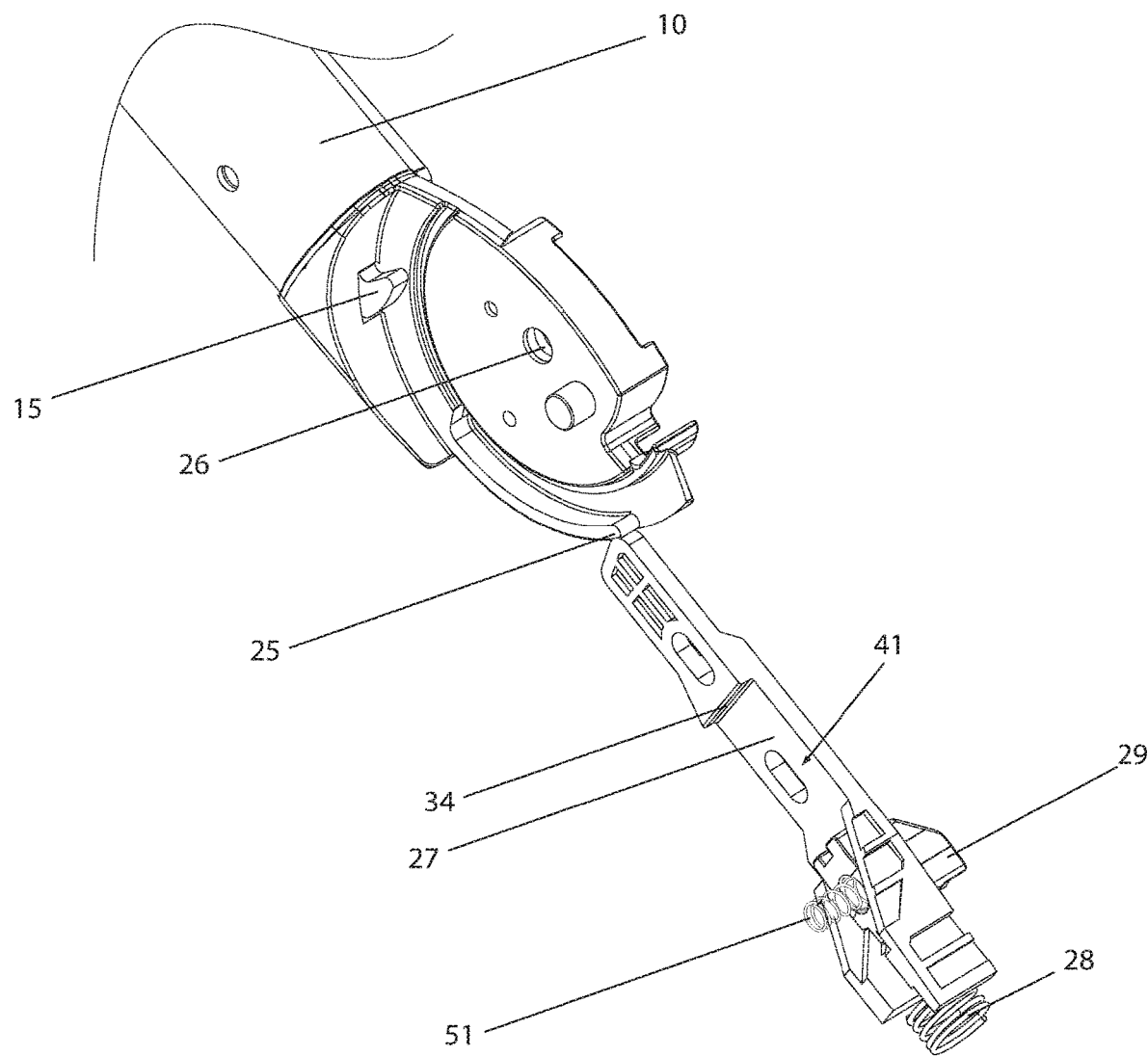
FIG. 4 shows a detail view of the locking of the release element in the pushchair of FIG. 1A.
Figure 5:
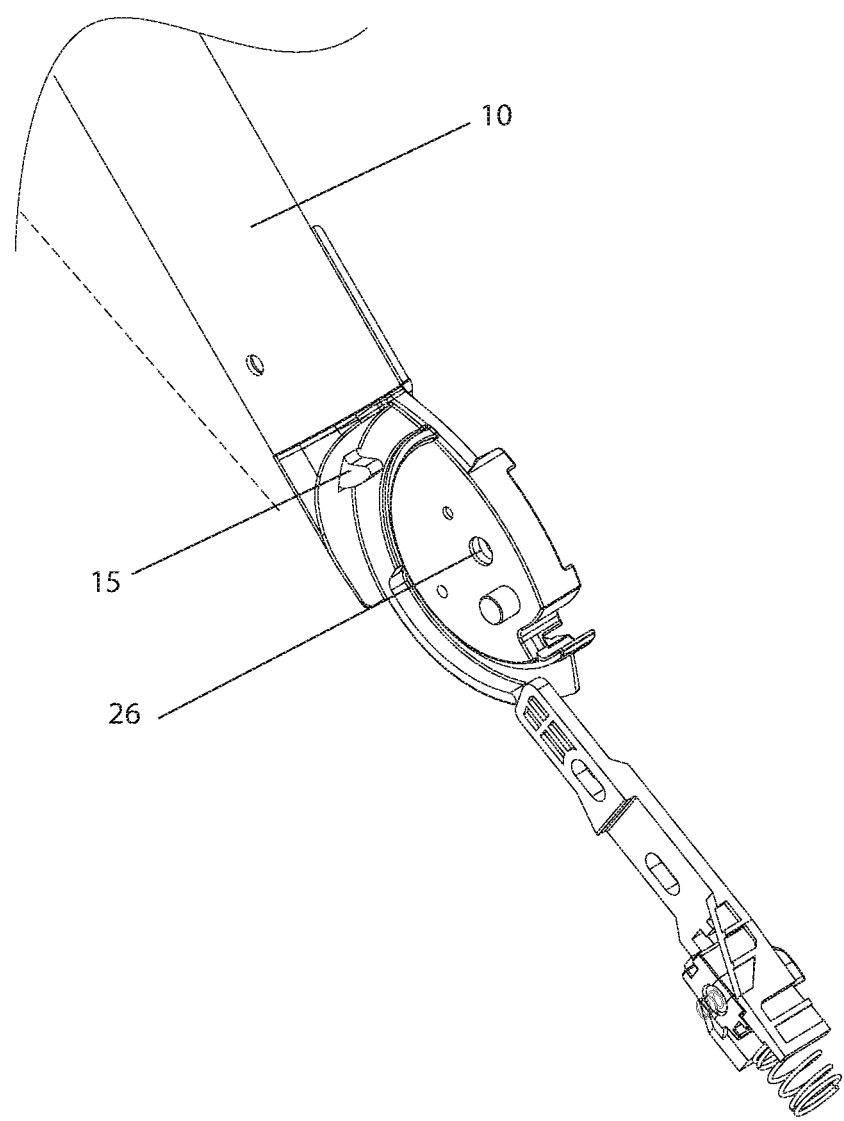
FIG. 5 shows a detail view of the unlocking of the release element in the pushchair of FIG. 1A.

Hinge parts 11, 12 can co-act so that second arms 10 can rotate forward in the direction of first arms 4. Hinge parts 11, 12 are for this purpose coupled via a shared shaft (not shown) which runs through an opening 26 of the hinge parts, see FIGS. 4 and 5, which show this opening only for second hinge part 12. It is noted here that first hinge part 11 is not visible in these figures.

Figure 2:
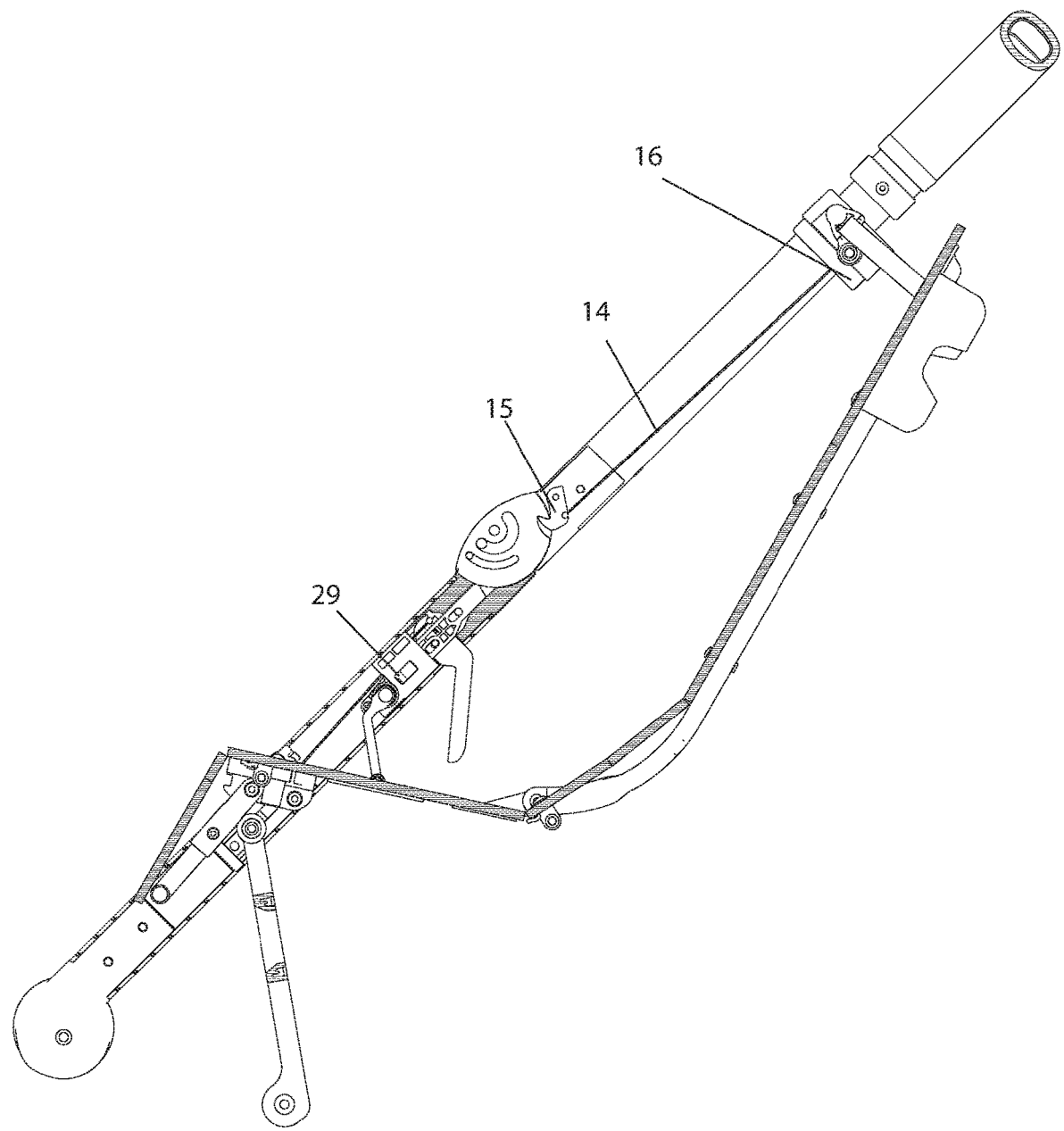
FIG. 2 shows a detail view of the child seat of FIG. 1A.

The locking of the rotation between first and second arms 4, 10 is realized by a hook 15 which can protrude from second arm 10. This hook engages on a structure (not shown) in first hinge part 11 in per se known manner. Hook 15 can be operated here by means of a handle 16 or other type of operation which is coupled by means of a transmission in the form of a cable 14 to hook 15, see FIG. 2. After operation of handle 16 hook 15 will be withdrawn from the engagement with the structure in first pivot part 11, whereby first and second arms 4, 10 can rotate relative to each other.

Pushchair 1 further comprises a seat 17 which has a back part 18 and a seat part 20. Back part 18 is connected by means of straps 19 to second arms 10. Seat part 20 is pivotally connected on either side to a first arm 4 at a pivot point A. Seat 17 further comprises a connecting arm 22 which is slidably and pivotally coupled to first arm 4 at a connecting point B, which can slide. This is achieved in that connecting arm 22 is pivotally coupled to a slide element 39 in the form of a wheel, which slide element 39 can slide in a guide in first arm 4 in the form of a groove 40. A triangular construction which increases the stability of seat 17 is hereby obtained.

In the locked state the sliding movement of slide element 39 is blocked by a blocking element 29, which is under spring tension of a first spring 51. In the locked state blocking element 29 protrudes into groove 40.

First arm 4 further comprises a release element 27 which is under spring tension of a second spring 28. This spring pushes release element 27 toward second hinge part 12.

Figure 6:
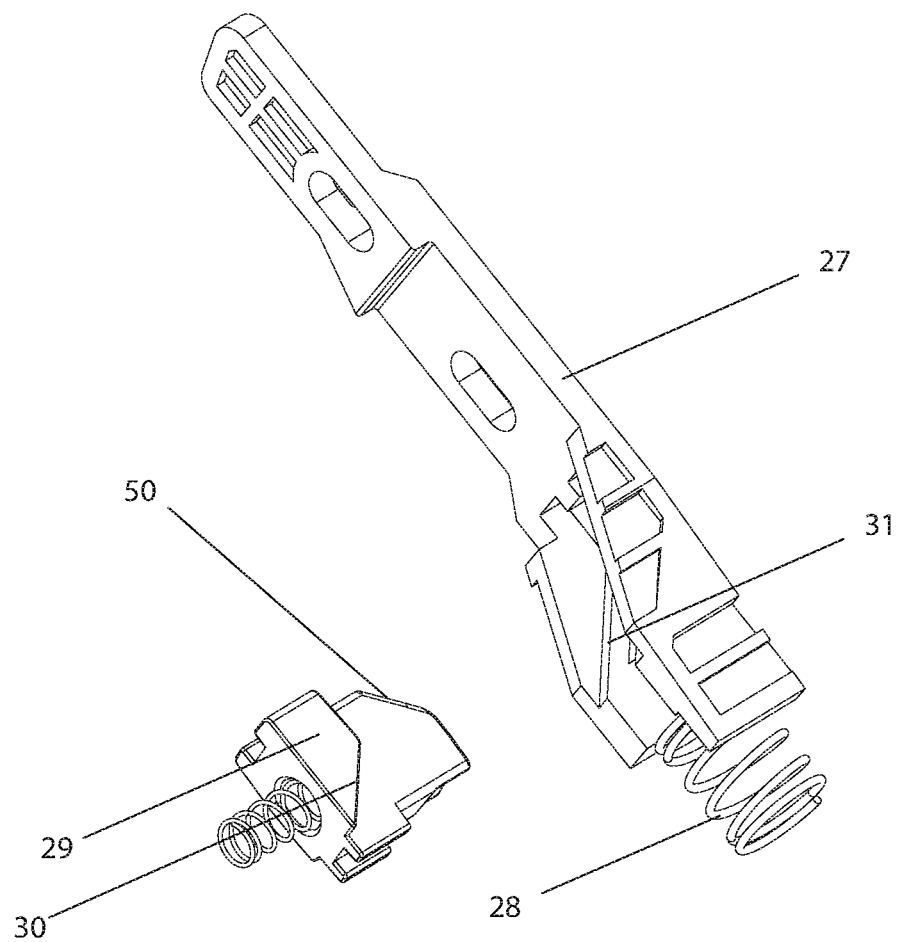
FIG. 6 shows a detail view of the release element and the blocking element in the pushchair of FIG. 1A.

FIG. 6 shows a detail view of blocking element 29 and release element 27. Visible in this figure are an edge 30 in the blocking element and an edge 31 in release element 27, which engage each other. When release element 27 moves toward second hinge part 12 as a result of the spring tension of second spring 28, release element 27 will push blocking element 29 counter to the spring tension of first spring 51 by means of edges 30, 31, whereby the blocking of the sliding movement of slide element 39 is terminated. In the locked state such a movement is however prevented in that second hinge part 12 comprises a stop 25 for release element 27 which blocks the sliding movement of release element 27. It is possible to deduce from FIGS. 4 and 5, which show respectively the locked and unlocked state, that stop 25 can no longer block release element 27 in the case of sufficient rotation of second arm 10. In the case of sufficient rotation release element 27 will therefore move toward second hinge part 12 and the blocking by blocking element 29 will be terminated.

FIG. 6 likewise shows an oblique wall 50 on the upper side of blocking element 29. This wall comes into engagement with slide element 39 when this moves toward undercarriage 2'. As a result of this engagement slide element 39 will move blocking element 29 out of groove 40 counter to the spring tension of first spring 51, whereby slide element 39 can continue to move.

Figure 3:
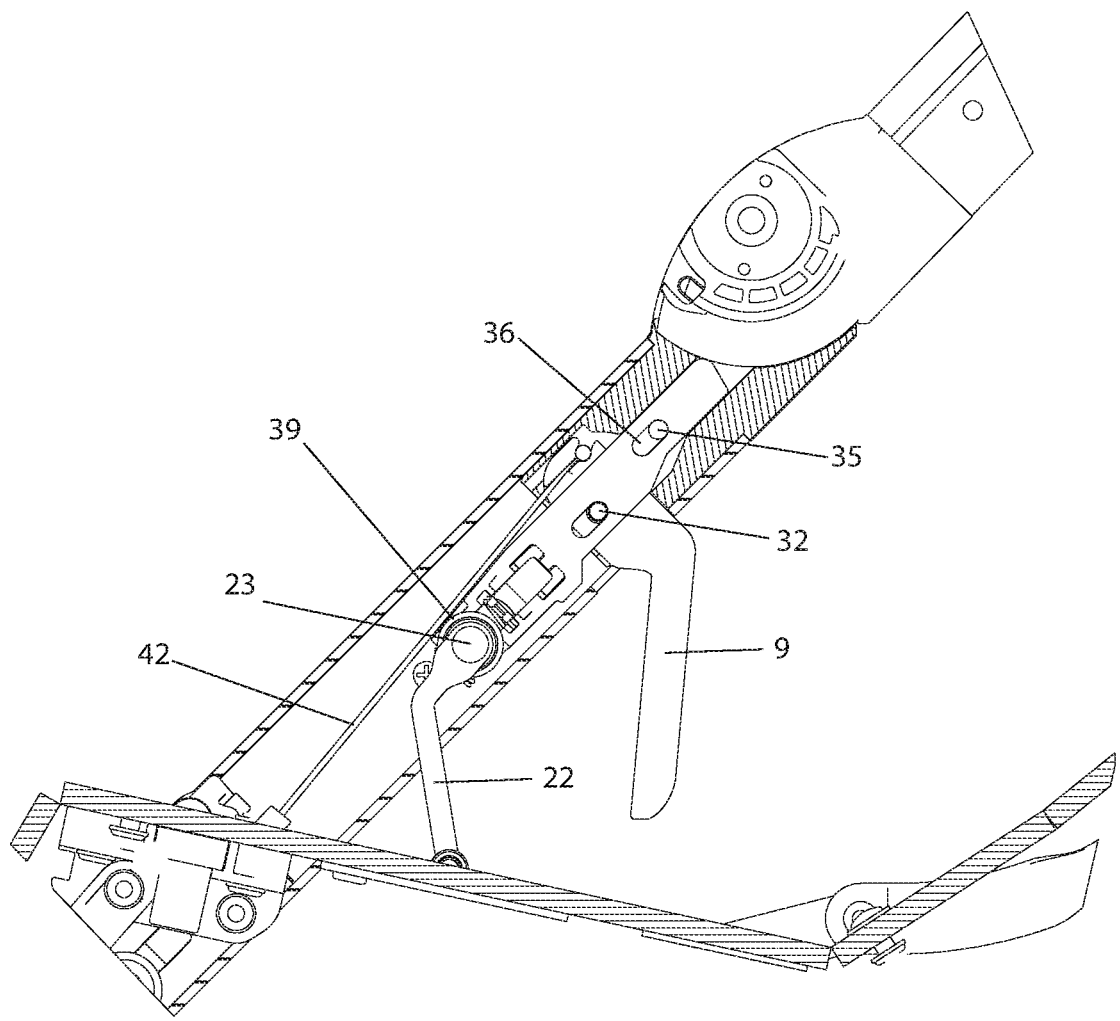
FIG. 3 shows a further detail view of the pushchair of FIG. 1A.

FIG. 3 shows how handle 9 is mounted in first arm 10. A pivot point 32 around which handle 9 can rotate is visible here. Also visible is a guide pin 35 which is received in a slot 36 of release element 27 and with which the movement of release element 27 can be guided.

Release element 27 comprises a stop 34 for engagement with handle 9. Stop 34 is here formed on an edge of a recessed portion 41 in release element 27. Recessed portion 41 provides the necessary space for handle 9. In the locked state stop 34 comes up against handle 9, and this latter cannot be operated. Operation of handle 9 is thus not possible until second arms 10 have rotated sufficiently so that stop 25 no longer pushes release element 27 downward counter to the spring tension of second spring 28 and so that release element 27 can move upward, whereby stop 34 no longer engages handle 9 and this latter can rotate about pivot point 32. A simultaneous unlocking of handle 9 and the sliding movement of slide element 39 is therefore realized.

Further connecting arm 8 can slide in side arms 3 in per se known manner. This sliding movement is locked by a known blocking device. Handle 9 is connected to this blocking device by means of a cable 42. The blocking of the sliding movement of further connecting arm 8 in side arms 3 can be terminated by operating handle 9.

As shown in FIG. 1A, seat 17 comprises a plurality of panels 37 which are pivotally connected to each other. Such a construction provides the option of seat 17 collapsing optimally and being readily adjustable to the rotation of first and second arms 4, 10.

The above shows that connecting arm 22 can be unlocked after sufficient rotation of second arms 10. As a result hereof seat 17 can be collapsed simultaneously to and automatically by the rotation of second arms 10. Pushchair 1 can be collapsed further still by operating handle 9.

It will be apparent to the skilled person that the present invention is not limited to the embodiments shown here but that various modifications are possible without departing from the scope of protection as defined by the appended claims.

The invention claimed is:

1. Device for transporting a child, comprising:
a wheel-bearing undercarriage comprising a pair of first arms extending in parallel and at a mutual distance obliquely toward a rear side of the device, wherein ends of the first arms remote from the wheels are provided with respective first hinge parts;
a pair of second arms extending in parallel and at a mutual distance, which are each provided at an end with a second hinge part, wherein the first and second hinge parts engage each other so as to enable a forward rotation of the second arms toward the first arms;
a child seat comprising a back part and a seat part, wherein the back part and the seat part are pivotally connected to each other;
wherein the back part is connected on either side to the second arms, wherein the seat part is pivotally connected to the first arms and wherein the child seat is further provided on either side with connecting arms which are each at an end pivotally connected to the seat part and at another end slidably and pivotally connected to a respective first arm, and
wherein the device further comprises blocking means for blocking or bounding a sliding movement away from the undercarriage of at least one connecting arm relative to the corresponding first arm, wherein the blocking means are configured to terminate the blocking of the sliding movement away from the undercarriage after a forward rotation of the second arms through angle greater than a predetermined threshold value.

2. Device according to claim 1, wherein the blocking means are further configured to allow a sliding movement toward the undercarriage of the at least one connecting arm relative to the corresponding first arm.

3. Device according to claim 1, wherein the device is movable between a folded-out state, in which state the blocking means block the sliding movement of the connecting arm away from the undercarriage, and an at least partially collapsed state, in which state the blocking means release or allow the sliding movement away from the undercarriage.

4. Device according to claim 1, wherein the child seat comprises a plurality of panels attached pivotally to each other.

5. Device according to claim 1, wherein the seat part is pivotally connected to the first arms at first points, which first points are each arranged between an end of the respective first arm facing toward the wheels and the connection of the corresponding connecting arm to this first arm.

6. Device according to claim 1, wherein each first arm has a guide extending in a longitudinal direction of the first arm and wherein the device further comprises per first arm a slide element received slidably in the guide, wherein each connecting arm is pivotally connected to a respective slide element.

7. Device according to claim 6, wherein the guide comprises a groove and wherein the slide element is received at least partially in this groove.

8. Device according to claim 6, wherein the blocking means comprise a blocking element and a first spring, wherein the blocking element is received slidably in the respective first arm and wherein the first spring is configured to exert a spring tension on the blocking element and slide it in a direction perpendicularly of the guide, whereby it can block the sliding movement of the slide element away from the undercarriage.

9. Device according to claim 8, wherein the blocking element is provided on the upper side with an oblique surface relative to the direction of the guide, wherein the oblique surface is configured such that during a movement toward the undercarriage the slide element engages the blocking element at the oblique surface and displaces it counter to the tension of the first spring, whereby the relevant sliding movement is not blocked.

10. Device according to claim 8, further comprising a second spring and a release element which extends in the longitudinal direction of the first arm and which is received slidably in the first arm, wherein the second spring is configured to exert a spring tension on the release element to slide the release element in the longitudinal direction, wherein the device is operative in:

a locked state in which the release element is held in a first position counter to the spring tension of the second spring, in which position the first spring holds the blocking element in a blocking state in which it blocks the sliding movement of the slide element away from the undercarriage;

an unlocked state in which the release element has moved from the first position and in the longitudinal direction of the first arm, such that the release element engages the blocking element and holds the blocking element in a releasing state in which it releases the sliding movement of the slide element away from the undercarriage.

11. Device according to claim 10, wherein the release element and the blocking element are each provided with edges which run obliquely as seen in the longitudinal direction of the first arm and which edges engage each other.

12. Device according to claim 10, wherein the second hinge part comprises a stop which engages the release element in the locked state and wherein after rotation of the second arm through an angle greater than said threshold value the stop has been displaced such that the release element can move in the longitudinal direction of the first arm, whereby the release element holds the blocking element in the releasing state.

13. Device according to claim 10, wherein the first arm is pivotally connected to a remaining part of the undercarriage.

14. Device according to claim 13, wherein the device comprises a further connecting arm which is slidably and pivotally coupled to one of the first arm and a remaining part of the undercarriage and which is pivotally coupled to the other of the first arm and a remaining part of the undercarriage, wherein the device further comprises a locking for locking the sliding movement of the further connecting arm and an operating member for operating the locking.

15. Device according to claim 14, wherein the operating member is engaged in the locked state by the release element such that the operating member cannot be operated, and wherein in the unlocked state the operating member is released by the release element, whereby it can be operated.

16. Device according claim 1, wherein blocking means are provided in each of the pair of first arms.

17. Device according claim 1, wherein the device comprises a pushchair or buggy.

* * * * *